May 7, 1968  L. R. HULLS  3,382,384
ELECTROMAGNETIC BRAKES AND CLUTCHES
Filed June 26, 1964  4 Sheets-Sheet 1
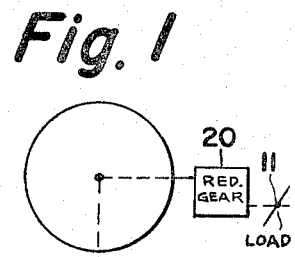
Fig. I
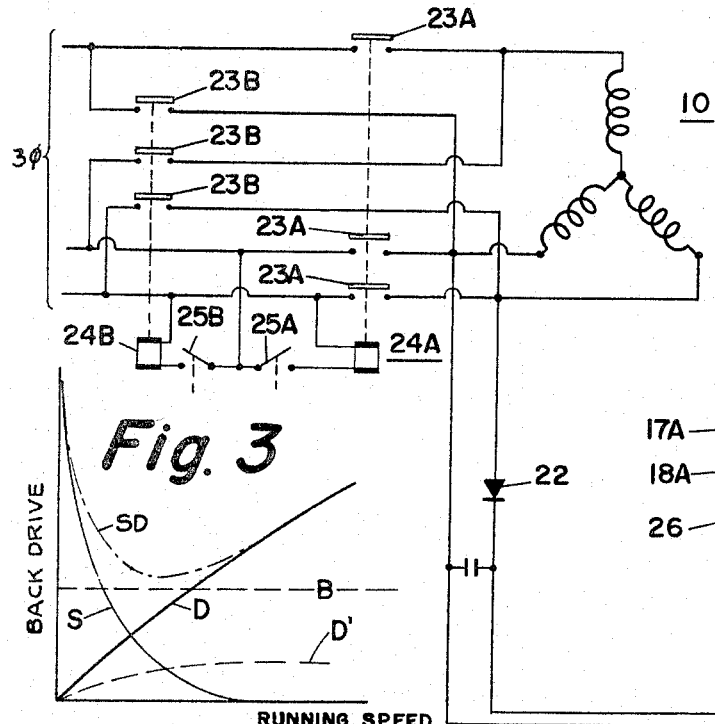
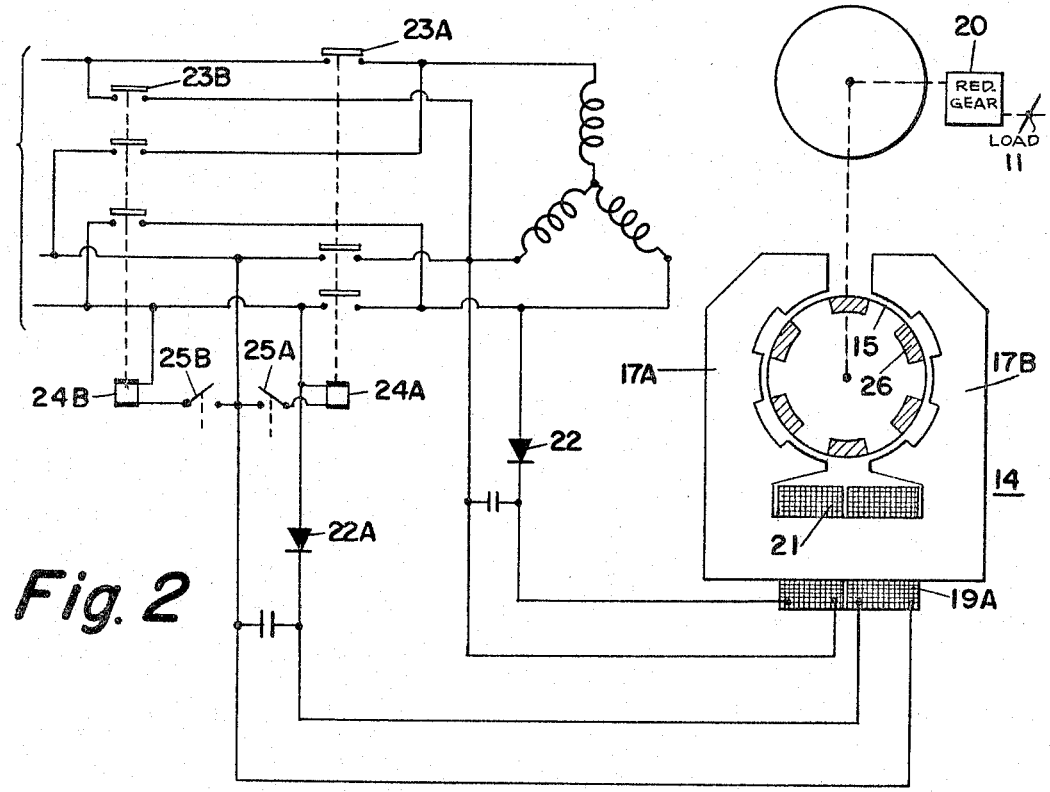
Fig. 2

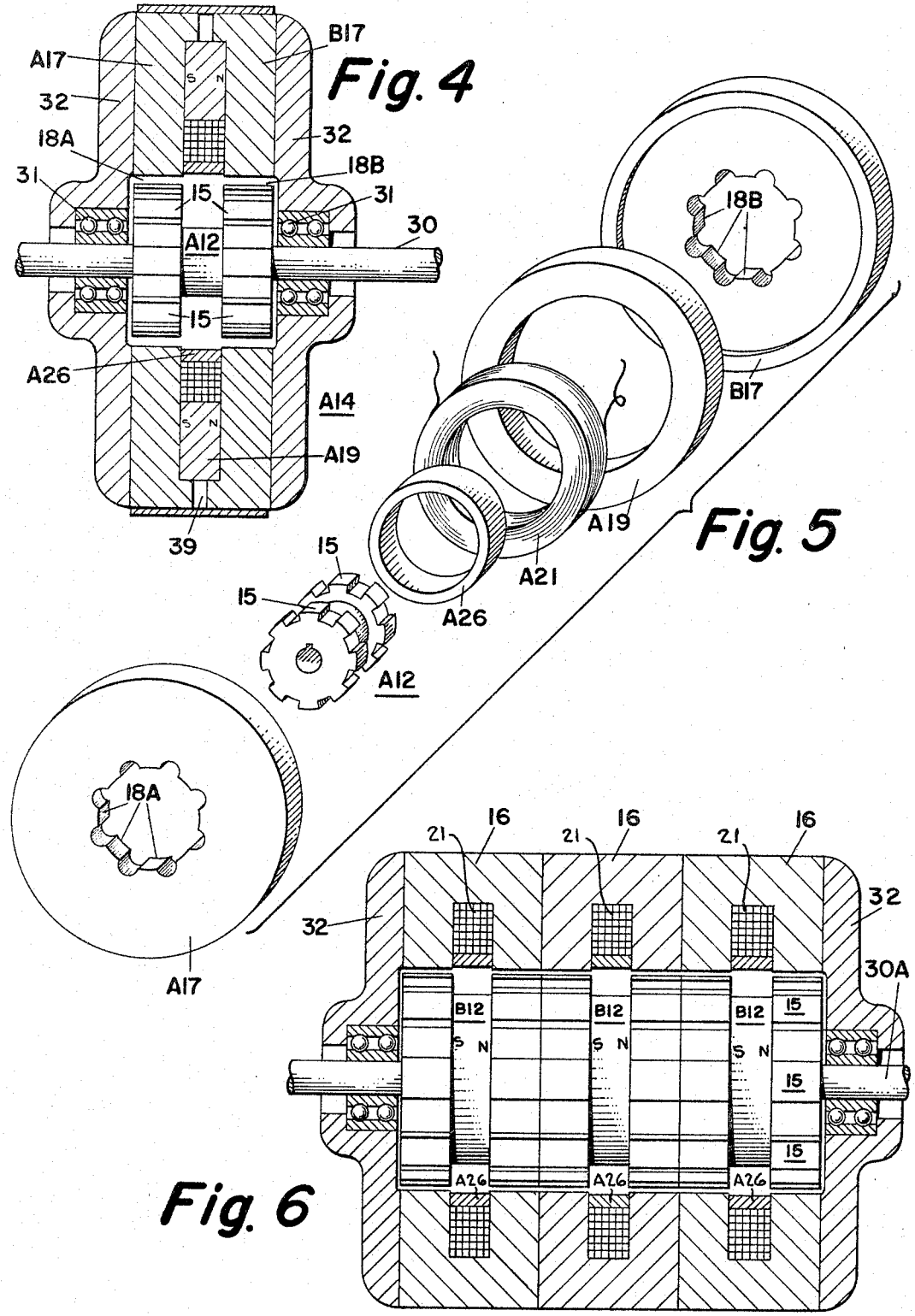

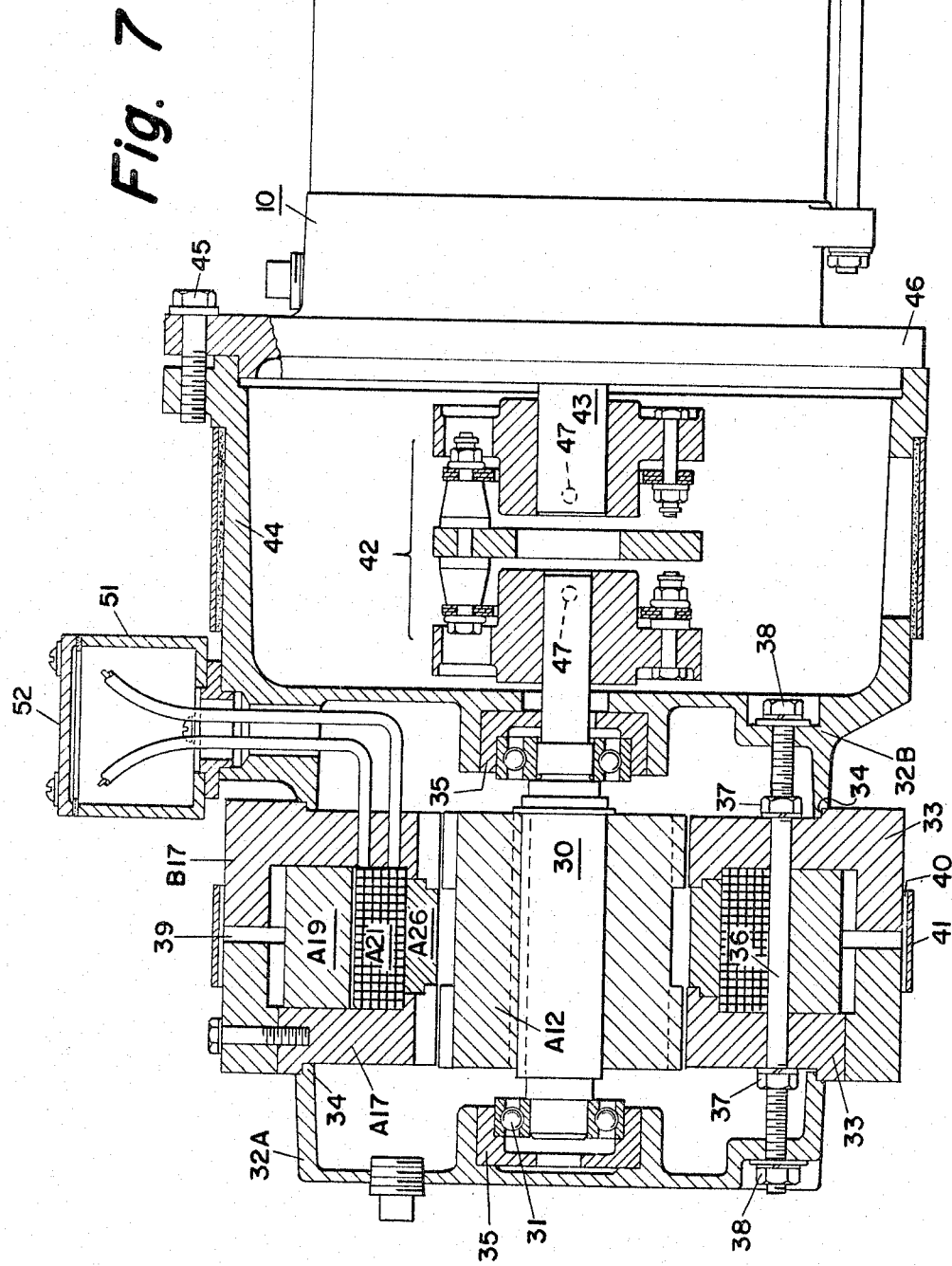

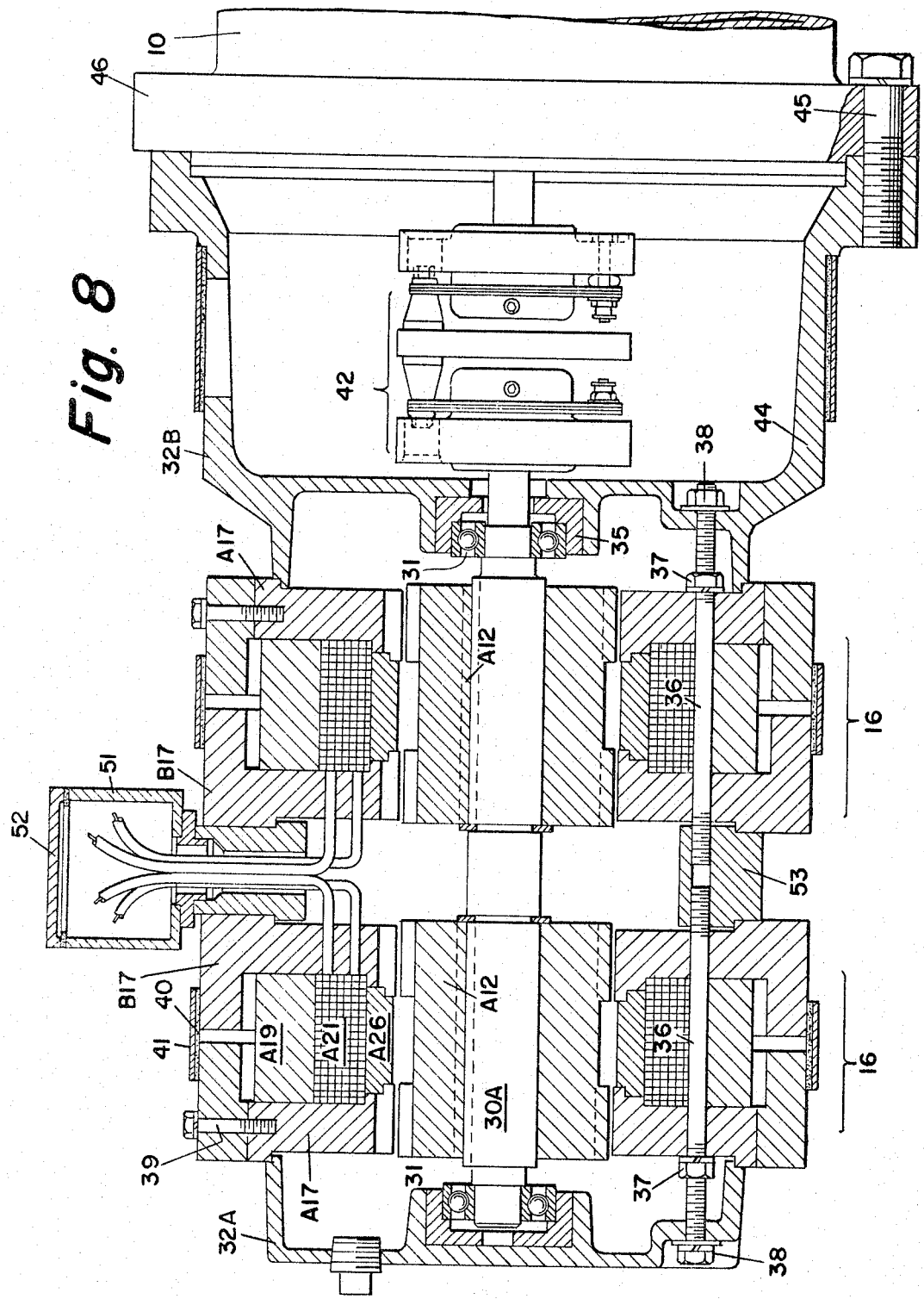

United States Patent Office 3,382,384
Patented May 7, 1968

3,382,384
ELECTROMAGNETIC BRAKES AND CLUTCHES
Leonard Robin Hulls, Gwynedd Valley, Pa., assignor to Leeds & Northrup Company, a corporation of Pennsylvania
Filed June 26, 1964, Ser. No. 378,292
12 Claims. (Cl. 310—93)

This invention relates to brake and clutch devices in which magnetic fields between relatively rotatable and physically-spaced magnetic structures are utilized to link the structures. Such devices may be used for dissipation of inertial energy of a motor-driven load, for braking torque against back-driving load, or for transmission of power, depending upon whether one of said structures is held stationary or said structures are respectively mechanically coupled to the motor and its load.

In accordance with the present invention, at least one pair of relatively rotatable magnetic structures are each provided with pole teeth separated by an air gap from the pole teeth of the other, the reluctance of the gap varying substantially with change in relative position of the teeth. Relative rotation of the structures from position of alignment of their pole teeth for minimum reluctance of the air gap is resisted by a non-frictional static-braking torque due to a magnetic field traversing the interteeth air gap and produced by a permanent magnet or an energized coil. To permit unrestrained relative rotation of the structure, the aforesaid magnetic field is bucked out or neutralized by energization of a different coil. To produce a non-frictional dynamic-braking torque, one of said structures is provided with one or more conductive paths encircling at least part of the pole-teeth flux for induction of eddy currents reversing in direction as the pole teeth move from one position of alignment to the next and of magnitude substantially increasing with increase of relative speed of the two structures.

The invention further resides in electromagnetic devices having novel and useful features of construction and arrangement hereinafter more fully described and claimed.

For a more detailed understanding of the invention, reference is made in the following description of various embodiments thereof to the accompanying drawings in which:

FIGS. 1 and 2 schematically illustrate two electromagnetic brakes and their associated circuitry in motor-drive systems;

FIG. 3 is an explanatory figure referred to in discussion of the braking characteristics of FIGS. 1, 2 and other figures;

FIG. 4 is an elevational view, partly in section, of the basic elements of the preferred device;

FIG. 5 is an exploded view showing elements of FIG. 4 in perspective;

FIG. 6 is an elevational view, partly in section, of an arrangement in which several sets of elements are used for increased torque capability;

FIG. 7 is a sectional view of a single braking unit and its motor mounting; and

FIG. 8 is a sectional view of a multi-unit brake and its motor mounting.

Referring to FIG. 1, the motor 10 for positioning the valve 11, or other load element, is coupled to the magnetic rotor structure 12 of the brake device 14. The peripheral surface of the rotor is slotted to provide a plurality of equally angularly-spaced pole teeth 15. The rotor is supported by means not shown for rotation relative to the magnetic yoke structure 16 which is of split construction to provide the pair of pole pieces 17A, 17B. The curved inner faces of the pole pieces are concentric to the rotor and each is slotted to provide pole teeth 18A, 18B of the same angular spacing as the rotor teeth 15. The lower ends of the pole pieces 17A, 17B are respectively engaged by the oppositely poled ends of a permanent magnet 19 so that all of the teeth 18A of the pole piece 17A are of one magnetic polarity and all of the teeth 18B of pole piece 17B are of the opposite magnetic polarity.

In the arrangement thus far described, the magnetic flux of the magnet 19 continuously flows across the air gap between the pole pieces and the rotor. With the motor 10 deenergized and at rest, the rotor 12 of the brake is restrained by magnetic forces in a position for which all of the stator teeth 18A, 18B are in radial alignment with teeth 15 of the rotor. Any back-drive from the load 11 is resisted by a frictionless static-braking torque due to the magnetic attraction between rotor and stator teeth, thus permitting high-efficiency gearing, instead of the more inefficient worm/worm-wheel gearing, to be used in the speed-reduction unit 20.

The brake device 14 also includes a coil 21, energizable from a DC source, which is so poled that the magnetic field it produces bucks out or neutralizes the field continuously produced by the permanent magnet 19, so freeing the rotor 12 for rotation relative to the pole pieces 17A, 17B. The current for exciting the neutralizing coil 21 may be derived from the motor circuit as completed for running of motor 10. Specifically in FIG. 1 which shows a reversible three-phase motor, the neutralizing coil 21 is connected across one phase of the motor with the diode 22 connected to rectify the AC current and so provide DC coil excitation. Thus, when the motor circuit is completed, as by closure of the line contacts of either of the directional power relays 24A, 24B, the coil 21 of the brake is concurrently energized substantially to eliminate the static-braking torque of the flux produced by magnet 19.

In automatic load-positioning systems, the control switches 25A, 25B for the directional power relays 24A, 24B may be selectively actuated by a recorder/controller in manner per se known.

When motor 10 of FIG. 1 is deenergized, the coil 21 of the brake 14 is concurrently deenergized so that again the flux produced by magnet 19 flows across the annular air gap between the rotor and each of the pole pieces 17A, 17B. It is to be noted, however, that magnetic attraction between the rotor and stator teeth is quite ineffective at the running speed of the deenergized motor—see curve S of FIG. 3. This is because as each rotor tooth 15 is carried away from alignment with one stator tooth, it is attracted by the next stator tooth. Thus, as rotor 12 passes from one position of tooth alignment to the next, the brake first subtracts from and then adds to the inertial energy of the motor/load system the average or net static-braking torque S falling off rapidly at higher rotor speeds. In consequence, the brake 14 as thus far described has little dynamic braking torque at higher speeds, and with high-efficiency gearing would be incapable of stopping the motor/load drive in event of appreciable back-drive from the load 11.

To obtain effective dynamic braking with the motor and coil 21 deenergized, the slots between the rotor teeth 15 of rotor 12 (FIG. 1) are utilized to receive the bars 26 of a squirrel cage winding. As each of these bars rotates from a position of alignment with one stator tooth to alignment with the next stator tooth, the voltage induced in it by the flux from magnet 19 is productive of $I^2R$ losses. Since these losses are supplied from the inertial energy of the deenergized motor/load system, the speed of that system is rapidly reduced to lower and lower levels. The dynamic-braking torque decreases, generally in accordance with curve D of FIG. 3, as the speed of the rotor 12 decreases relative to the stator 16. However, at the lower rotor speeds, the static-braking torque increases at much greater rate (curve S) so that the sum of the static and dynamic-braking torques (curve SD) is effective to bring the motor/drive to a stop despite substantial back-drive torque B from the load.

By way of specific example, a brake having the construction of FIG. 1 with a rotor approximately only two inches in diameter, three inches long, and with 27 teeth provided, on test, a maximum of 30 ft./lbs. static torque and dynamically it was able to stall a ¾ horsepower 1750 r.p.m. three-phase induction motor with 300% pull-out torque used to simulate the back-drive torque of load 11.

The arrangement shown in FIG. 2 is the same as that of FIG. 1 except that the permanent magnet 19 is replaced by a coil 19A which is continuously energized by DC current derived from one phase of the power-line via rectifier 22A or the line side of the directional relays 24A, 24B. Since the corresponding elements of FIGS. 1 and 2 are identified by the same reference characters, the preceding description of FIG. 1 is applicable to FIG. 2 and need not be repeated. The permanent magnet arrangement of FIG. 1 is preferred because in event of power-line failure the load is held by the brake in its last adjusted control position whereas with the arrangement of FIG. 2 a power-line failure would result in deenergization of coil 19A and the brake would be incapable of producing either dynamic or static-braking torque to decelerate the motor or to prevent back-drive from moving the load device to a stop-limited position of its range of travel.

In the modification shown in FIGS. 4 and 5, the magnetic rotor structure A12 is spool-shaped with its opposite ends each peripherally grooved to provide angularly spaced pole teeth 15. The ends of the rotor shaft 30 are rotatably supported by the bearings 31 in the end caps or shields 32 of the device. The two annular stator members A17, B17 are fastened between the end caps with their inner peripheries in alignment with but slightly spaced from the respective corresponding enlarged ends of the rotor A12. The inner peripheries of each of the annular pole members A17, B17 are slotted to provide pole teeth of the same width and pitch as the rotor pole teeth. The adjacent inner faces of the annular pole pieces A17, B17 are spaced by the annular permanent magnet A19 which is axially magnetized so that all of the teeth 18A of pole member A17 at one end of the rotor are of one polarity and all of the teeth 18B of the pole member B17 at the other end of the rotor are of like opposite polarity.

For the homopolar construction, a squirrel-cage arrangement of rotor conductors such as shown in FIGS. 1 and 2 would not provide dynamic braking. Instead, a ring A26 of copper, aluminum or other non-ferrous conductor is fastened between the opposed faces of the stator pole members A17, B17 near their inner notched peripheries, so that it forms a winding encircled by the magnetic flux flowing from one of the stator pole members A17, B17 across the air gap to one end of the rotor, through the rotor, and thence from the other end of the rotor and across the air gap to the other of the stator pole members. During relative rotation of the rotor and stator teeth, this flux is pulsating and so induces flow of current in the ring A26, the magnitude and frequency of the current depending upon the speed of relative rotation.

Two or more sets of the elements shown in FIG. 5 may be assembled along a single shaft between a single pair of end bells 32 in manner shown in FIG. 6 to meet higher torque requirements of a wide range of motor/drive systems. The individual rotor-stator units of FIG. 6 as shown differ from that of FIG. 4 in that, instead of using a permanent magnet in the stator structure, a permanent magnet forms at least the hub section of a rotor B12 which is otherwise similar to rotor A12 of FIG. 4.

With the symmetrical circular "stator" construction shown in FIGS. 4 to 6, the electromagnet device may be used either as a brake or as a clutch. For use as a brake, the stator structure 16 is anchored by any suitable means to a machine frame or other structure which is stationary. For use as a clutch, both of the relatively rotatable magnetic structures 14, 16 are left free to rotate in space with provision for coupling one of them to the motor 10 and the other to the load via speed-reduction gearing. Also for clutch use, the "stator" 16 or its housing has slip rings engagable by stationary contact brushes to provide for energization of its neutralizing coil 21 and also of its brake coil if one is used instead of permanent magnet A19.

For the homopolar construction shown in FIGS. 4 to 6 and also in FIGS. 7, 8 to be later herein described, the preferred number of pole teeth for each of the stator members and for each end of the rotor is about eight. If that number is substantially exceeded, the dynamic-braking torque of the device is insufficient (as exemplified by curve D′ of FIG. 3) to decelerate the motor/drive to a speed at which the static-braking torque alone or in combination can prevent undue coasting or stop the deenergized motor despite back-drive from the load. If the number of poles is much fewer than about eight, the adjustment of the position of the load device 11 is coarsened because there are only a few positions of the rotor (A12 or B12) at which it can be magnetically locked to the stator.

The single-unit brake construction shown in FIG. 7 is basically the same as that shown in FIG. 4 and corresponding elements are identified by the same reference characters in avoidance of needless repetition of description. In FIG. 7, the outside face of each of the stator members has a concentric recess formed by flange 33 and which receives a mating flange 34 of the corresponding end shield 32A or 32B. Each of the rotor-shaft bearings 31 is supported by the corresponding end shield and is magnetically isolated therefrom by an interposed non-ferrous bushing 35 to preclude shunting or by-passing of the rotor flux by the end shields and rotor shaft when of iron or steel. The air gap 39 between the adjacent rim faces of the stator members A17, B17 is sealed by gasket 40 and its clamping band 41 to exclude magnetic debris which would shunt out the reluctance of the gap. The annular stator members are clamped upon the intervening annular magnet A19 and conductive ring A26 by an angularly-spaced series of rods 36 having stator-clamping nuts 37 threaded thereon. The opposite end portions of the rods 36 extend through the end shields 32A, 32B and threadably receive the nuts 38 which clamp the end shields to opposite ends of the stator assembly and with the rotor concentric to the toothed apertures of the stator members.

The end shield 32B is extended to form a housing portion 44 for the flexible coupling means 42 which connects the rotor shaft 30 of the brake unit to the shaft 43 of motor 10. The motor end of housing 44 is attached as by bolts 45 directly to the end shield 46 of the motor. Access to the set screws 47 which hold two of the coupling elements to the shafts 30, 43 is afforded by the normally-closed aperture 50 in the housing 44. The end shield 32B of the brake unit also supports a terminal box 51 having a cover 52 for access to the leads from the neutralizing coil A21.

In the brake arrangement shown in FIG. 8, two stator structures 16 are clamped between the end shields 32A, 32B and the associated rotors A12 are spaced along a common rotor shaft 30A supported at its opposite ends in the bearings 31 of the end shields. In this multi-unit brake, the stators are separated by a non-ferrous spacer 53 into which the inner ends of the clamping rods 36 of both stators are threaded. The terminal box 51 for the neutralizing-coil leads from both units is carried by the spacer 53. In other respects, the multi-unit brake of FIG. 8 is similar to the single-unit brake of FIG. 7, and further description thereof appears unnecessary. It is, of course, to be understood that, within reason, any additional number of brake units may be added by using a longer rotor shaft and such additional stator spacers 53 as are necessary.

In all of the reluctance brake and clutch devices described herein, it is not necessary that either the rotor structure or the stator structure be made of stacked laminations. Both of them may be of solid iron or steel and may be castings or forgings.

It is to be understood the invention is not limited to the specific constructions disclosed but additionally includes equivalents within the scope of the appended claims.

What is claimed is:
1. An electromagnetic device suited for a system including motor means and a load element positioned thereby comprising
at least one pair of relatively rotatable magnetic structures, each having spaced pole teeth separated by an air gap from pole teeth of the other structure,
means for mechanically coupling one of said structures to the motor means for rotation relative to the other of said structures,
means for producing a magnetic field linking said relatively rotatable structures by magnetic flux traversing said air gap between the pole teeth of said structures to provide a non-frictional static-braking torque alternately resisting and assisting relative rotation of said structures from one to the next position of alignment of their pole teeth for minimum air-gap reluctance,
coil means energizable to buck out said magnetic field to permit relative rotation of said structures, and
non-magnetic conductive means disposed on one of said structures and providing a winding for cooperation with said magnetic field when said coil means is deenergized to provide a non-frictional dynamic-braking torque reducing the relative speed of said structures during their relative rotation.

2. An electromagnetic device as in claim 1 in which the means for producing said magnetic field is a permanent magnet to provide said static and dynamic-braking torques independently of any current source.

3. An electromagnetic device as in claim 1 in which the means for producing said magnetic field is a second coil means energizable from a current source.

4. An electromagnetic device suited for a system including motor means and a load element positioned thereby comprising
at least one pair of relatively rotatable magnetic structures, each having spaced pole teeth separated by an air gap from pole teeth of the other structure,
means for mechanically coupling one of said structures to the motor means for rotation relative to the other of said structures,
means for producing a magnetic field linking said structures by magnetic flux traversing said air gap to provide a non-frictional static-braking torque resisting relative rotation of said structures from position of alignment of their pole teeth for minimum air-gap reluctance,
coil means energizable to buck out said magnetic field to permit relative rotation of said structures, and
conductive means disposed for cooperation with said magnetic field when said coil means is deenergized to provide a non-frictional dynamic-braking torque reducing the relative speed of said structures during their relative rotation,
one of the magnetic structures being a slotted rotor,
said conductive means being a series of bars respectively disposed in the slots between adjacent pole teeth of the rotor and electrically connected by rings at opposite ends of the rotor,
the other of said magnetic structures being a yoke split diametrically of the rotor to provide a series of adjacent teeth of one polarity and another series of adjacent teeth of opposite polarity.

5. An electromagnetic device suited for a system including motor means and a load element positioned thereby comprising
at least one pair of relatively rotatable magnetic structures, each having spaced pole teeth separated by an air gap from pole teeth of the other structure,
means for mechanically coupling one of said structures to the motor means for rotation relative to the other of said structures,
means for producing a magnetic field linking said structures by magnetic flux traversing said air gap to provide a non-frictional, static-braking torque resisting relative rotation of said structures from position of alignment of their pole teeth for minimum air-gap reluctance,
coil means energizable to buck out said magnetic field to permit relative rotation of said structures, and
conductive means disposed for cooperation with said magnetic field when said coil means is deenergized to provide a non-frictional, dynamic-braking torque reducing the relative speed of said structures during their relative rotation,
one of the magnetic structures being a spool-shaped rotor whose opposite ends are each slotted to provide pole teeth in axial alignment with pole teeth at the other end of the rotor,
the other of said magnetic structures including a pair of spaced annular members having their inner peripheries slotted and spaced to provide pole teeth adjacent the pole teeth of the corresponding ends of the rotor,
said coil means being disposed between said spaced annular members and being concentric with said rotor,
said conductive means being a ring concentric to and within the coil means.

6. An electromagnetic device as in claim 5 in which the rotor is permanently magnetized to provide one polarity for all teeth at one end of the rotor and opposite polarity for all teeth at the other end of the rotor.

7. An electromagnetic device as in claim 5 in which the field-producing means is an annular permanent magnet axially polarized and disposed between said spaced annular members.

8. An electromagnetic device as in claim 7 in which the outer peripheries of said annular members are spaced to provide an air gap.

9. An electromagnetic device as in claim 5 which additionally includes non-magnetic bearings respectively disposed beyond opposite ends of the rotor to support the shaft of the rotor without significant by-passing of the magnetic flux between the toothed ends of the rotor and said annular members.

10. An electromagnetic device as in claim 9 which additionally includes end shield means which is mechanically connected to one of said annular members, which supports one of said bearings, and which is provided with means for attachment to the frame of said motor with the axis of said rotor in alignment with the motor shaft.

11. An electromagnetic device as in claim 1 in which said other of the two magnetic structures is held stationary and in which the coil means is energized concurrently with deenergization of the motor to effect deceleration of the motor and its load by the dynamic-braking torque of said conductive means and to hold the stopped motor against any back-drive from the load by the static-braking torque between aligned pole teeth of said structures.

12. An electromagnetic device as in claim 1 in which said other of the two magnetic structures is free to rotate and is provided with means for transmitting power from the motor to the load and with ring-brush connections from said coil means for connection to an external current source, in which said coil means is deenergized concurrently with energization of the motor to transmit power from the motor to the load via the static-braking torque between aligned pole teeth of said members, and in which said coil means is energized concurrently with deenergization of the motor to decelerate the motor and its load at substantially proportional rates.

References Cited

UNITED STATES PATENTS

| | | |
|---|---|---|
| 2,765,878 | 10/1956 | Pierce. |
| 2,738,449 | 3/1956 | Mason. |
| 2,614,668 | 10/1952 | Waderlow et al. |
| 2,612,248 | 9/1952 | Feiertag. |
| 704,574 | 7/1902 | Pintsch _____ 310—95 X |
| 2,488,827 | 11/1949 | Pensabene _____ 310—105 |
| 2,544,360 | 3/1951 | Schmidt _____ 192—12 |
| 2,962,144 | 11/1960 | Heinemann _____ 192—84 |

FOREIGN PATENTS

| | | |
|---|---|---|
| 1,128,911 | 5/1962 | Germany. |

DAVID X. SLINEY, *Primary Examiner.*